(12) United States Patent
Kuan

(10) Patent No.: US 6,213,008 B1
(45) Date of Patent: Apr. 10, 2001

(54) MULTI-FUNCTIONAL FOOD PROCESSOR

(76) Inventor: Huo Feng Hsia Kuan, No. 32, Lane 2, Show-Gang Wu Street, Hsin-Tien, Taipei Hsien (TW)

( * ) Notice: Subject to any disclaimer, the term of this patent is extended or adjusted under 35 U.S.C. 154(b) by 0 days.

(21) Appl. No.: 09/660,833

(22) Filed: Sep. 13, 2000

(51) Int. Cl.⁷ .............................. A23N 1/02; A47J 43/06; B02C 18/18; B02C 25/00
(52) U.S. Cl. .................................. 99/492; 99/495; 99/506; 99/508; 99/510; 241/37.5; 241/92; 241/199.12; 241/282.1; 241/101.1
(58) Field of Search ..................... 49/492, 495, 501–513, 49/623–631; 241/37.5, 68, 92, 93, 282.1, 282.2, 199.12, 101.1, 101.2, 285.1, 280, 100, 166, 169, 273.1, 285.2; 83/355, 356.3, 592, 326, 423, 932, 435.2

(56) References Cited

U.S. PATENT DOCUMENTS

| | | | |
|---|---|---|---|
| 4,198,887 | * | 4/1980 | Williams, Jr. ...................... 83/592 X |
| 4,227,655 | * | 10/1980 | Williams ................................ 241/92 |
| 4,277,995 | * | 7/1981 | Sontheimer ........................ 83/592 X |
| 4,283,979 | * | 8/1981 | Roakocy ............................. 241/92 X |
| 4,331,300 | * | 5/1982 | Hicks et al. ....................... 241/282.1 |
| 4,369,680 | * | 1/1983 | Williams ............................ 99/510 X |
| 4,393,737 | * | 7/1983 | Shibata .......................... 241/282.2 X |
| 4,448,100 | * | 5/1984 | Breeden .............................. 241/92 X |
| 4,700,901 | * | 10/1987 | McClean ........................... 241/282.1 |
| 4,706,896 | * | 11/1987 | Moon-Kau .......................... 241/37.5 |
| 4,768,429 | * | 9/1988 | Federighi ............................ 99/623 X |
| 4,840,119 | * | 6/1989 | Caldi .................................. 99/513 X |
| 5,435,237 | * | 7/1995 | Huang .................................... 99/510 |

* cited by examiner

Primary Examiner—Timothy F. Simone
(74) Attorney, Agent, or Firm—Dougherty & Troxell (57) ABSTRACT

A multi-functional food processor comprises a processing rack, a elevated device and/or a rotary device. An appropriate tool stand is selected to fixedly attach an end of the processor rack. Then, adjust the turning knob in the elevated device such that the wedge on the push lever displaces to actuate the wedge together with the base plate displacing vertically for changing the difference of elevation between the base plate and the cutter. When a treated food touches the cutter, the slice product with desired thickness or the powder product with desired grains can be cut or ground properly. For the treated food being cut into shreds, repeat procedures of selecting the tool stand and adjust the elevated device to obtain a desired difference of elevation between the base plate and the cutter. Then, the turning knob is pulled outward and turned to rotate the shaft in the cutter carriage till the cutters with desired cutting width emerging through the guide slots on the base plate and make the rotary device be in a state of locking. During sliding on the base plate, the treated food is cut a depth and a width by the equally spaced cutters first, and then cut into shreds or strips while pass through the cutter.

33 Claims, 9 Drawing Sheets

MULTI-FUNCTIONAL FOOD PROCESSOR

BACKGROUND OF THE INVENTION

1. Field of the Invention

The present invention relates to a multi-functional food processor, and particularly to a food processor being possible to be operated manually for performing functions such as slicing, shredding, and grinding.

2. Description of Related Art

Vegetables and fruits have been vital food for us since very ancient age. Due to an increasing amount of income, more delicate cooked food or mixed vegetable and fruit salad is increasingly demanded. It is well known by family housekeepers and lovers of mixed vegetable and fruit salad that a vegetable or a fruit with tuberous or long shape such as potato, cucumber, carrot, and etc. being cut slices and shreds is a very tedious job. In the mean time, a cut wound may often result from carelessness during processing the vegetable or the fruit. Hence, it is hard to do a good job for cutting the vegetable or the fruit delicately unless providing a skillful cutting experience. Furthermore, a good looking appearance of cut vegetable or fruit after being processed is greatly influenced by the experience of the person preparing the food, and it substantially influences the dining air and appetite.

Besides, in order to enhance the taste of western food, a piece of cheese or chocolate is ground into powder so as to be spread over and stirred in the food before eating. However, it is not possible for the family housekeeper to make the powder without any means.

In fact, the food processor can be classified into two categories and one is electrical mode and the other is manual mode. There is a common feature for both modes of the food processor that a single function is provided only. That is, one of functions, such as slicing, shredding, or grinding, is offered instead of all of the functions. Thus, various food processors with single function have to be bought and it causes not only an inconvenience for storing these food processors but also a waste of money.

Moreover, in order to control the thickness of each cut slice, it is necessary to replace a different cutter in the conventional food processor such that the thickness of each slice can be changed by way of changing the location of the cutter. In order to control the width of each cut shred, it is necessary to replace a different cutter either in the conventional food processor such that the width of each shred can be changed by way of a varied plurality of equidistant upright cutters at the top of cutting tool. Hence, it can be understood that a sophisticate procedure of replacing different cutters has to be performed respectively in the conventional food processor for changing the thickness of cut slice and the width of cut shred. In addition, it is inconvenient that a storage space is required to offer for being occupied by these conventional food processors.

SUMMARY OF THE INVENTION

An object of the present invention is to provide a multi-functional food processor, which is able to cut or grind a treated food into slices, shreds or powder to make the processing job easy and simple.

Another object of the present invention is to provide a multifunctional food processor, which offers a simplified structure to make cleaning job easy and complete.

A further object of the present invention is to provide a multifunctional food processor, which is convenient to be used outdoors as well as indoors.

A further object of the present invention is to provide a multifunctional food processor, which is possible to process the treated food directly in spite of the size of the treated food.

BRIEF DESCRIPTION OF THE DRAWINGS

Other objects and features of the present invention can be more fully understood by the following description and accompanying drawing, in which.

DETAILED DESCRIPTION OF THE PREFERRED EMBODIMENTS

Referring to FIGS. 1 to 9, basically, the food processor according to the present invention comprises a processing rack 1, an elevated device 2 and/or a rotary device 3.

The processing rack 1 is an elongated framework with a base plate 11 in the middle area thereof and two opposite frame walls 12. A gap 13 is provided between the base plate 11 and each of the frame walls 12 respectively such that the free end of the base plate 11 may displace longitudinally. The free end of the base plate 11 is provided with at least a wedge 111 at the bottom thereof and preferably a respective wedge 111 at opposite sides of the bottom. A plurality of parallel guide slots 112 equally spaced to each other are disposed at the top of the base plate 11e 11 to interact with the elevated device 2 and the rotary device 3. In addition, The frame walls 112 at bottom thereof provides a pair of locating holes 121 and a pair of fitting holes 122 to correspond to the wedge 111 and guide slots 112 for locating and fitting with the elevated device 2 and the rotary device 3 respectively.

Figure 1:
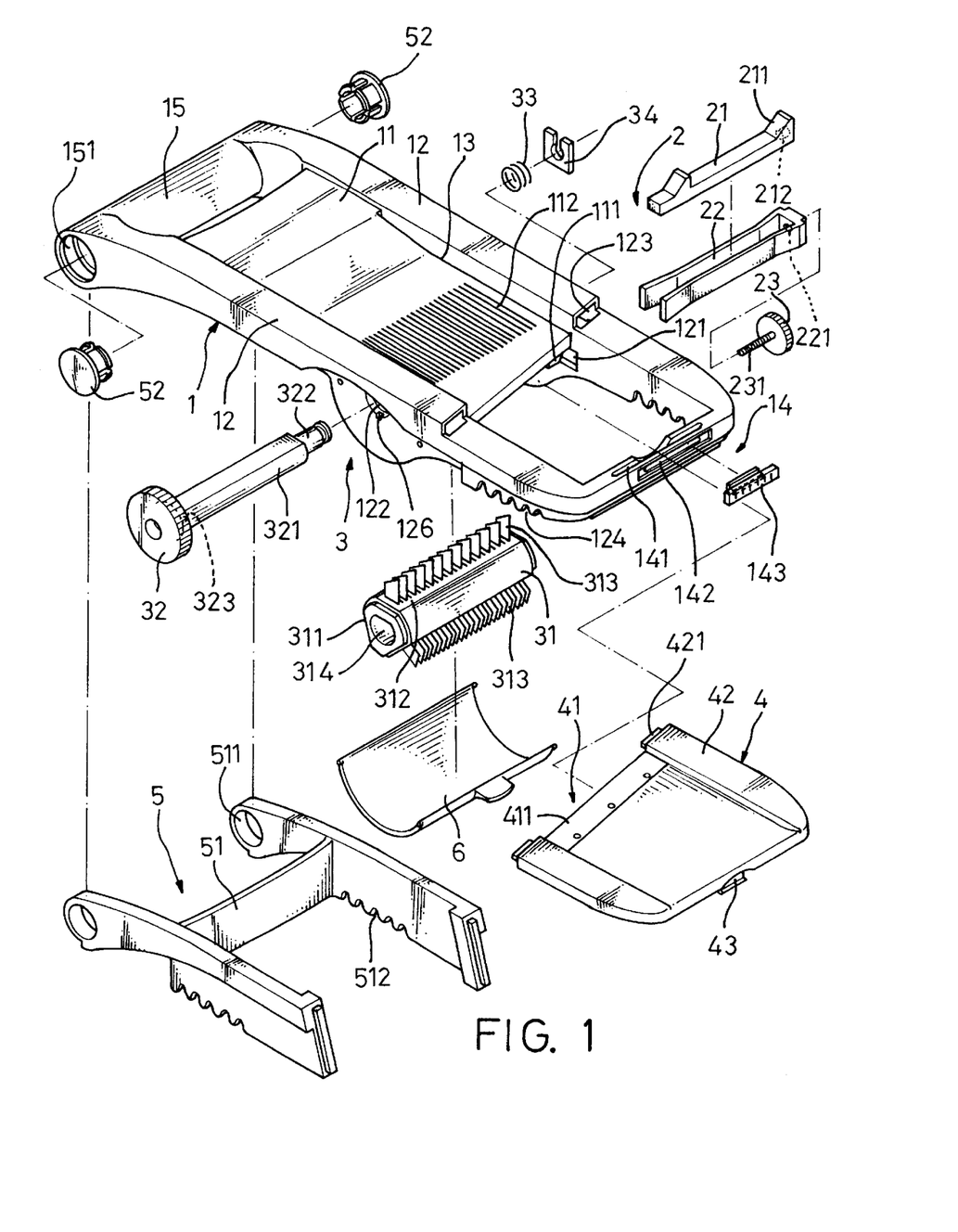
FIG. 1 is a perspective view of multi-functional food processor according to the present invention.
Figure 8A:
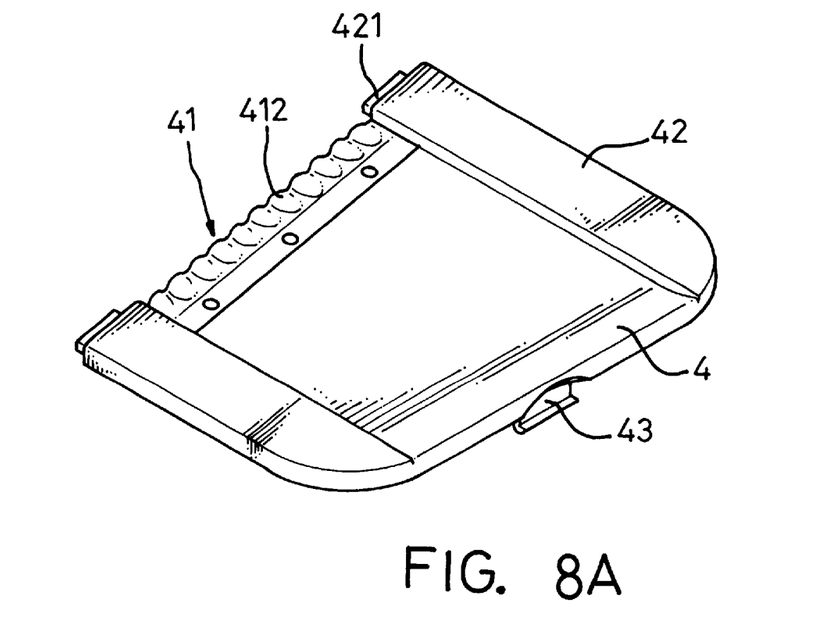
FIG. 8A is a perspective view of another cutter used in the multifunctional food processor of the present invention.
Figure 8B:
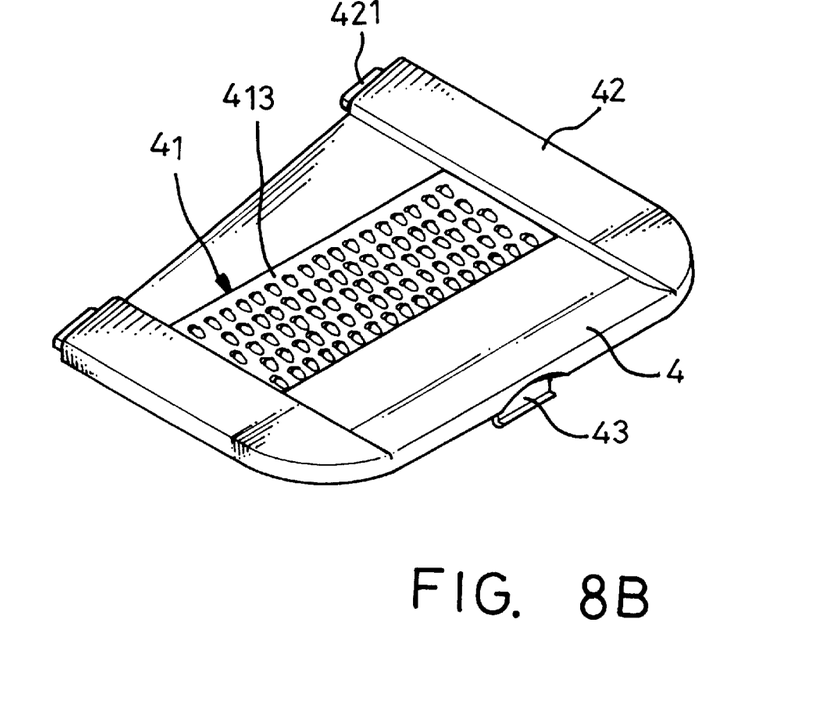
FIG. 8B is a perspective view of a further cutter used in the multifunctional food processor of the present invention.

Besides, the processing rack 1 at the rear end thereof is disposed a tool stand 4 near the base plate 11 and a cutter 41 on the tool stand 4 is adjacent to the free end of the base plate 11. Thus, a treated work piece can be cut into slices, or shreds, or ground as powder. As shown in FIGS. 1, 8A, and 8B, the cutter 41 can be a flat knife 411, or a wavy knife 412, or grinding disk 413 depending on the operation has to be done. Hence, the finished food product has a shape of flat cross section, a wavy shape, or powder shape.

Preferably, the processing rack 1 and the tool stand 4 are designed to detachably fix in place such that the cuter 41 can be changed as desired by way of replacing different tool stand 4. Accordingly, both stand walls 42 on the tool stand 4 are provided with a projecting part 421 respectively at an end thereof to engage with corresponding notches 123 disposed in the frame walls 12 such that the stand walls 42 can join the frame walls 12 oppositely. A lock piece 43 is disposed at an outer end of the tool stand 4 to engage with a lock device 14 on the processing rack 1 such that the tool stand 4 can be fixedly attached to an end part of the processing rack 1. The lock device 14 has an engaging recession 141 corresponding to the lock piece 43 and a guide groove 142 is provided in the lock device 14 at a lateral side thereof vertically for being inserted a slide lock 143. Thus, the lock piece 43 can be placed in the engaging recession 141 and the slide lock 143 is moved to engage with the lock piece 43 to constitute a state of locking. In this way, the tool stand 4 is firmly located at a lateral side of the processing rack 1.

Figure 2:
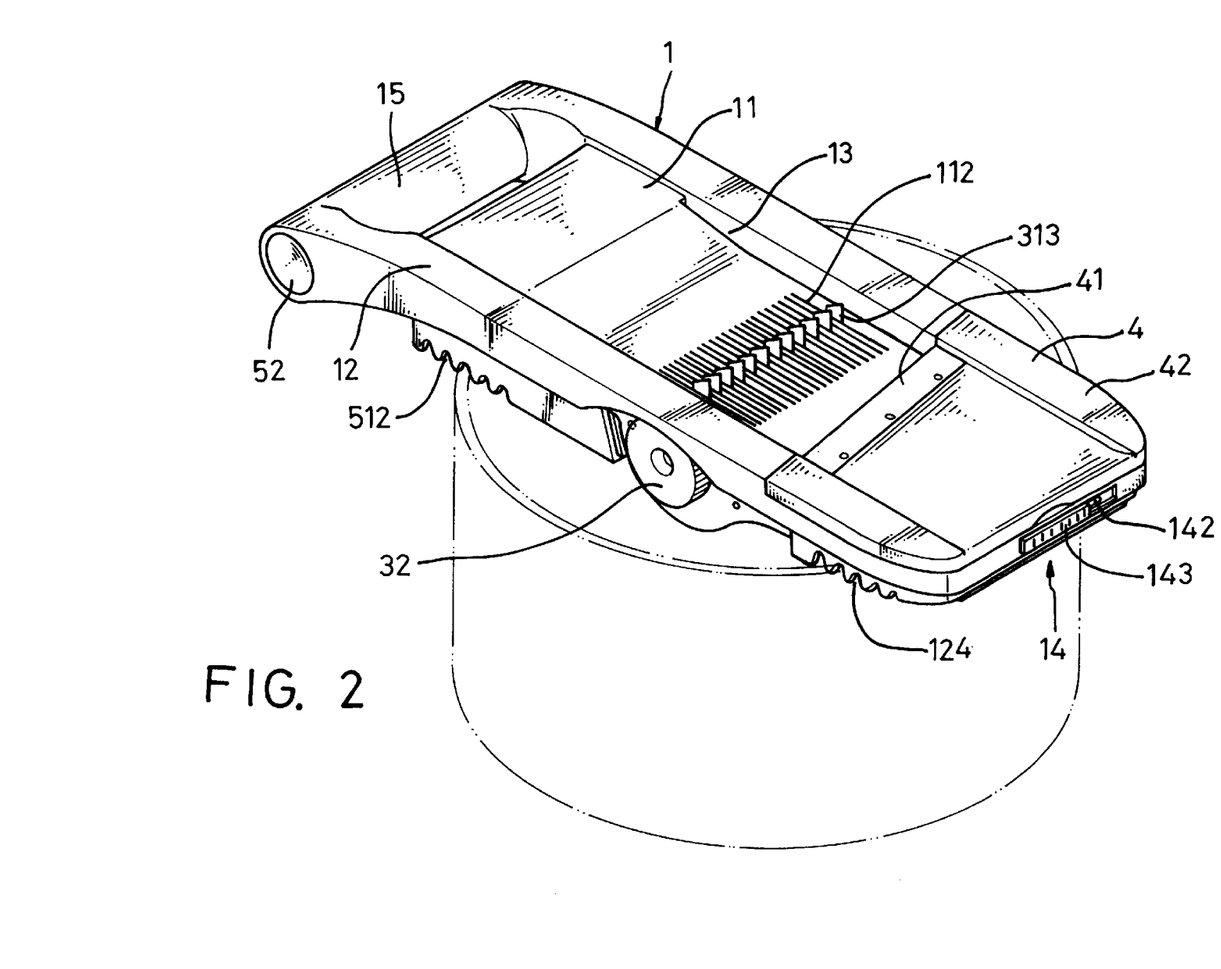
FIG. 2 is an assembled perspective view of multi-functional food processor shown in FIG. 1.
Figure 3:
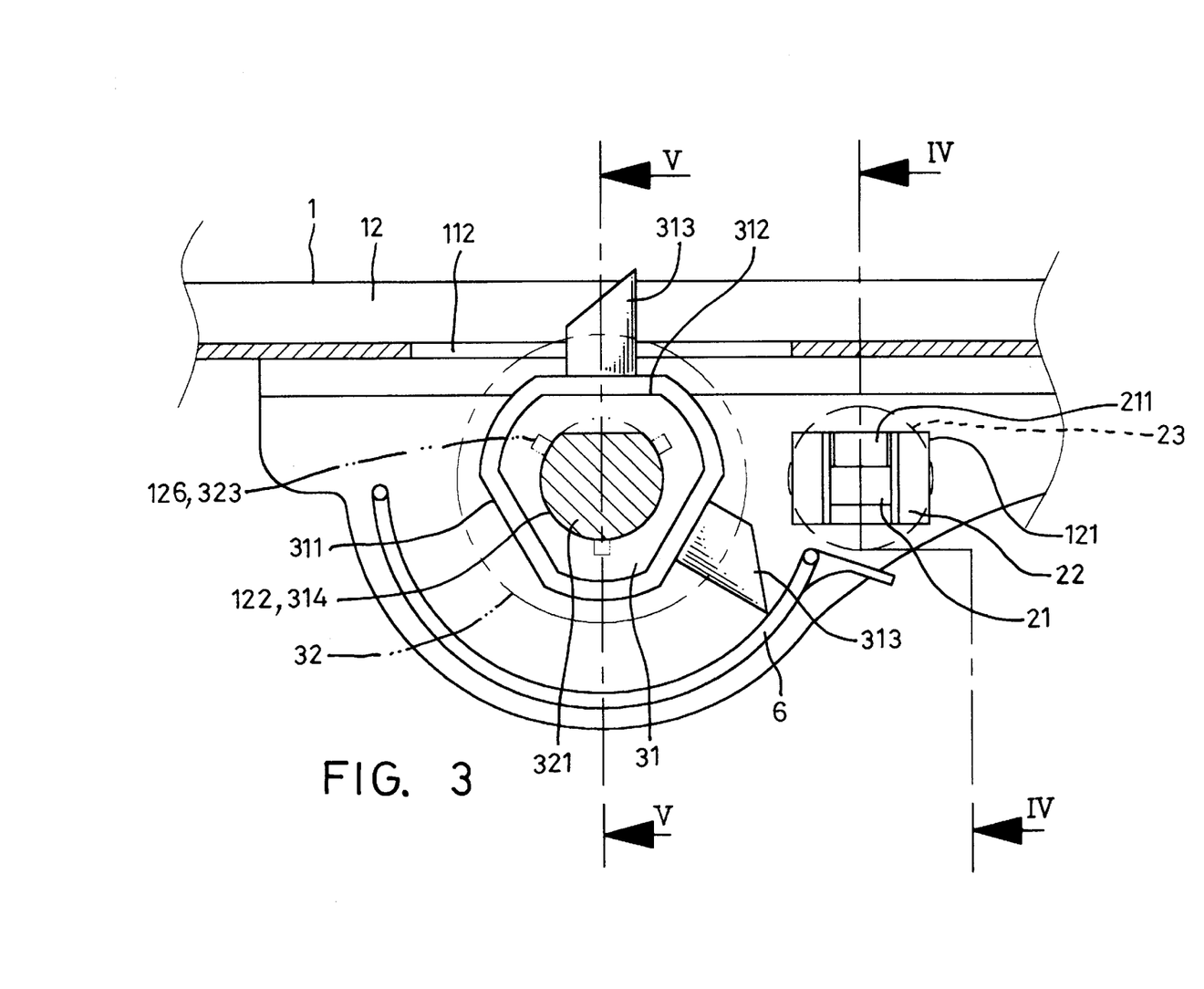
FIG. 3 is an enlarged fragmentary sectional view of food processor according to the present invention.
Figure 9:
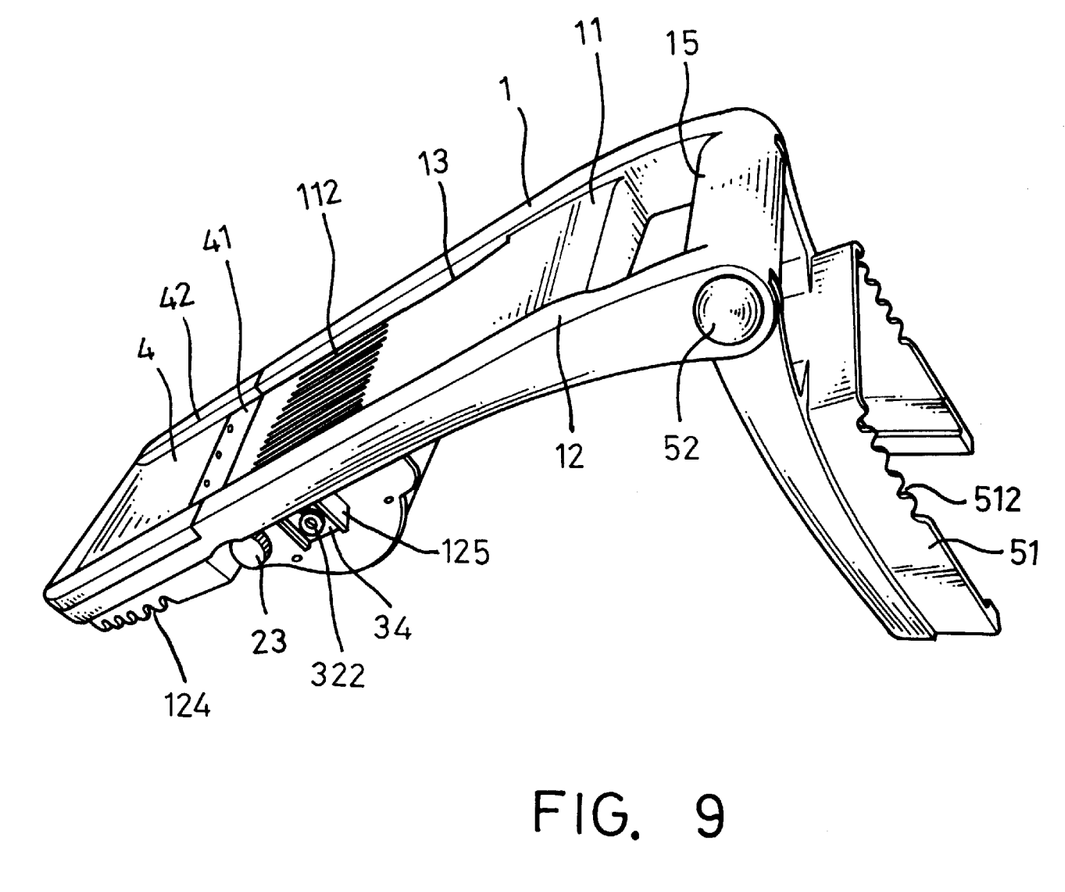
FIG. 9 is a perspective view similar to FIG. 2 illustrating a support device on the multi-functional food processor of the present invention in a state of opening.

Furthermore, in order to be feasible for receiving the food product, both of frame walls 12 on the processing rack 1 may be provided with a plurality of locating notches 124 at the bottom thereof respectively. One of the notches 124 under the respective frame wall can be selectively placed astride the upper edge of a container indicated by dash lines in FIG. 2 such that the container can receive the food product after cutting or grinding. In addition, a support device 5 may be fixed to a handle part 15 at the other end of the processing rack 1 to make the food processor being operated conveniently. The handle part 15 at both ends thereof is provided with a respective recess hole 151 and a H support frame 51 is mounted between the frame walls 12 to align fitting holes 511 on the support frame 51 with the recess holes 151. A respective pivot bolt 52 passes through each fitting hole 511 and engages with each recess hole 151 such that the support frame 51 can be rotated relative to the handle part 15. Therefore, the support frame 51 may be arranged either in the processing rack 1 for storage as shown in FIG. 2 or to move outward with respect to the pivot bolts 52 as shown in FIG. 9. It can be seen that in FIG. 9 that the base plate 11 becomes in a state of being inclined for easily cutting or grinding the treated food. Moreover, the support frame 51 at the bottom thereof provides a plurality of notches 512 corresponding to the notches 124 under the tool stand 4 for being instead of the notches 124 under the handle part 15.

Figure 4:
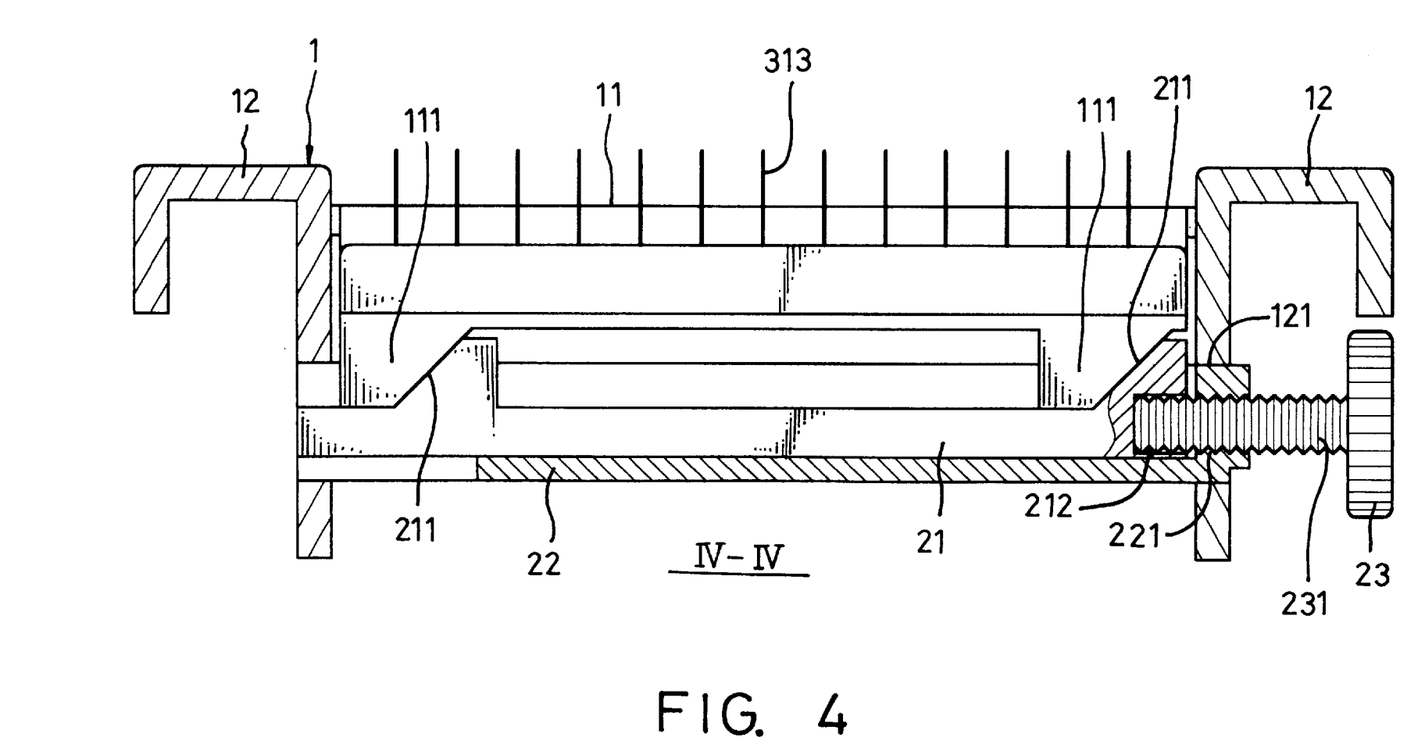
FIG. 4 is a sectional view along line IV—IV in FIG. 3.
Figure 5:
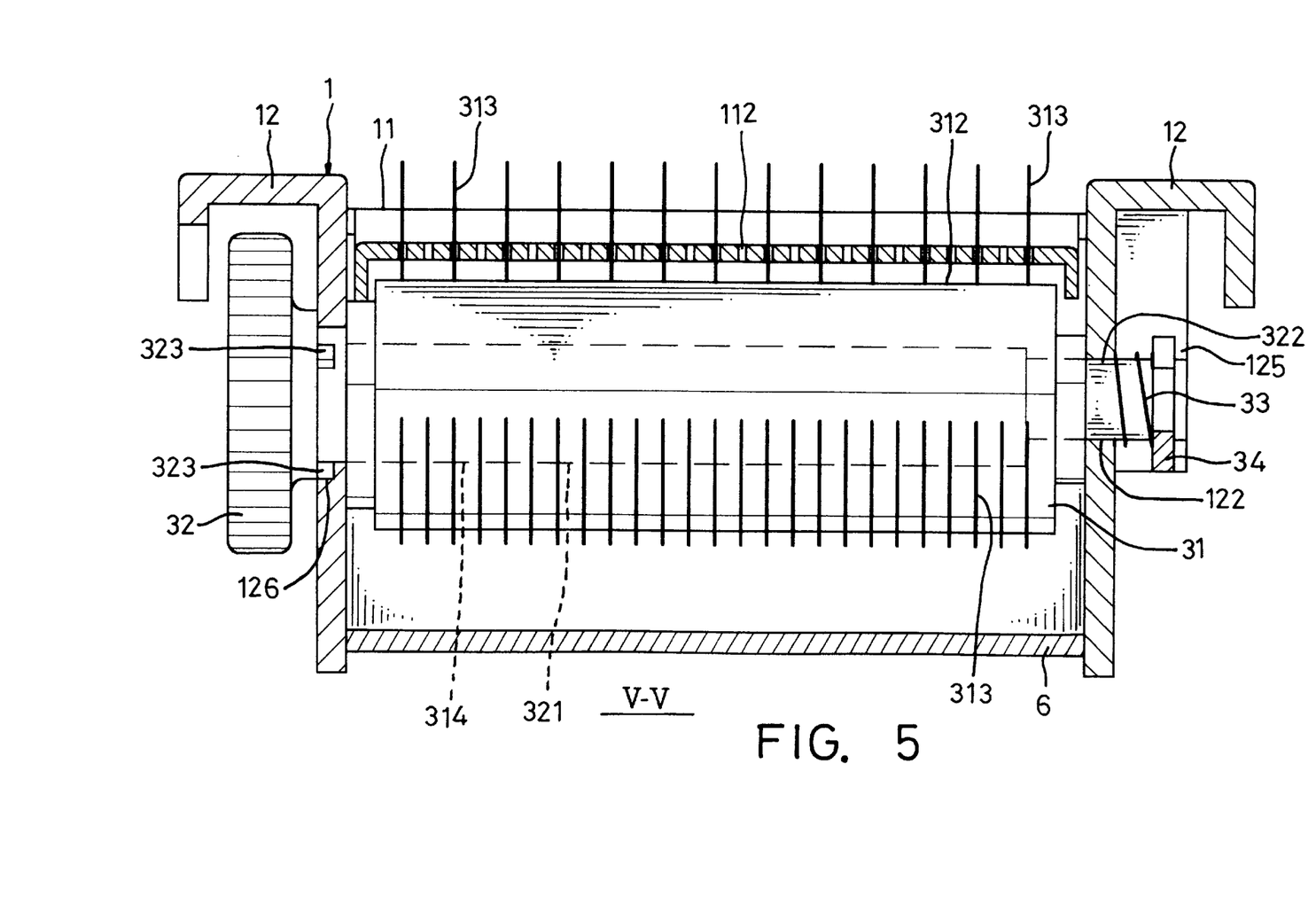
FIG. 5 is a further sectional view along line V—V in FIG. 3.

The elevated device 2 is comprised of a push lever 21 being placed between a lever seat 22. The lever seat 22 is disposed and fixed between two locating holes 121 in the processing rack 1 to make a wedge part 211 on the push lever 21 correspond to and bear the wedge 111. A turning knob 23 has a threaded rod 231 to engage with a fixing hole 221 in the lever seat 22 so as to be located at locating hole 212 at an end of the push lever 21. Referring to FIGS. 1 and 4, once the turning knob is rotated, the threaded rod 231 is urged to press the push lever 21 moving forward along with the wedge part 211. While the wedge part 211 is in the process of displacement, the wedge 111 is urged to move upward along the inclined surface on the wedge part 211. The base plate 11 then moves upward because of said two gaps 13 to change the difference of elevation from the cutter 41 such that the thickness of cut slice or the fineness of ground powder.

The rotary device 3 comprises a cutter carriage 31 disposed between two fitting holes 122. The cutter carriage 31 has two flat planes 311 oppositely inclining an equal angle and at least a cutting plane 312. It is preferable that two cutting planes 312 are arranged and a plurality of equally spaced cutters 313 are provided on the respective cutting plane 312 corresponding to the guide slots 112. A shaft 321 with turning knob 23 passes through one of the fitting holes 122 and an axial locating hole 314 and an fitting end 322 of the shaft 321 extends outward from the other fitting hole 122 and is enclosed by a bias means such as a spring 33. Then, the fitting end 322 is fixed to a fixing plate 34 between two stop pieces 125 at two opposite sides of said other fitting hole 122. Besides, the fitting hole 122 at the side of turning knob 23 is provided with a plurality of lock recessions 126 with equal angular space around the edge thereof based on the sum of the flat planes 311 and the cutting planes 312. The turning knob 32 provides a plurality of lock pieces 323 to correspond to the lock recessions 126.

Referring to FIGS. 1, 3, and 5 again, while the operation of cutting shreds is processed, the lock device is released from lock at first, that is, turning knob 32 is pulled outward to separate the lock pieces 323 from the lock recessions 126. At this time, the spring 33 is biased against the fixing plate 34. Then, release the pull force exerting the turning knob 32 and turn the knob 32 such that the lock pieces 323 rotate around the outer wall of the fitting hole 122 and the cutter carriage 31 rotates with the shaft 321. When cutters with appropriate cutting width emerge through the guide slots 112, the lock pieces 323 may engage with the lock recessions 126 again to form a state of locking. The spring 33 at this time stretches and the fixing plate 34 restores to the original position thereof. The user may carry the treated food to slide along the base plate 11 and the treated food is cut into semi-products of shred with a proper depth and a required width as long as the cutters 313 are contacted. The semi-products are displaced to the spot of cutting tool 41 to be sheared for proper length. Hence, the operation of cutting shred is complete.

When the food processor is not in using, the above said releasing the lock device again and the turning knob 32 is rotated to locate the flat planes 311 under the guide slots 112. In this way, the procedure of storage for the cutters 313 is complete.

In order to avoid any possible potential danger while the cutters 313 is in a state of being stored, a movable safety cover 6 is axially connected to the processing rack 1 at the lower part of the rotary device 3. When the safety cover 6 is removed, the procedure of washing and cleaning for the cutters 313 can be performed properly.

Figure 6:
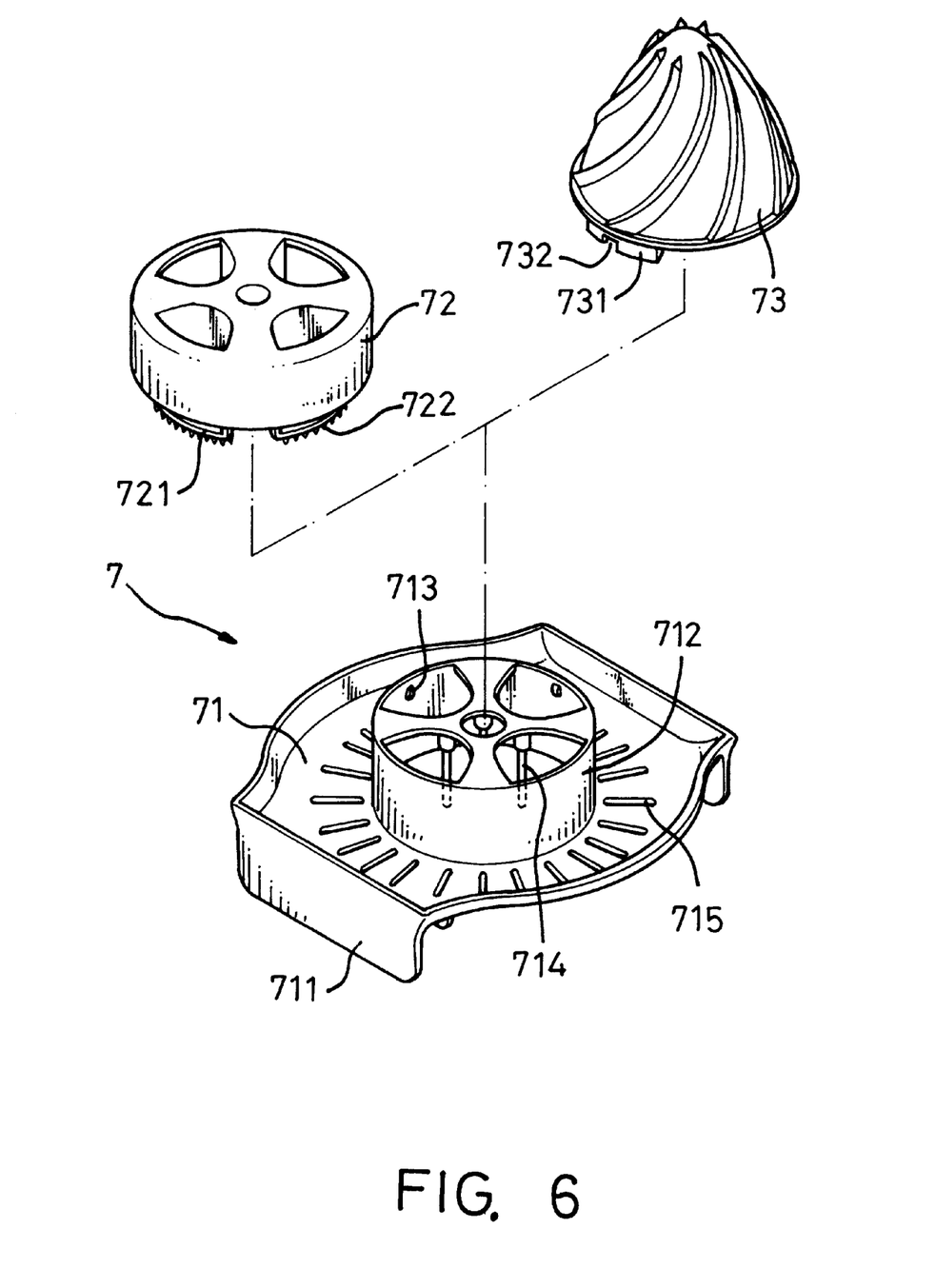
FIG. 6 is a disassembled perspective view of a sliding device in the multi-functional food processor of the present invention.
Figure 7:
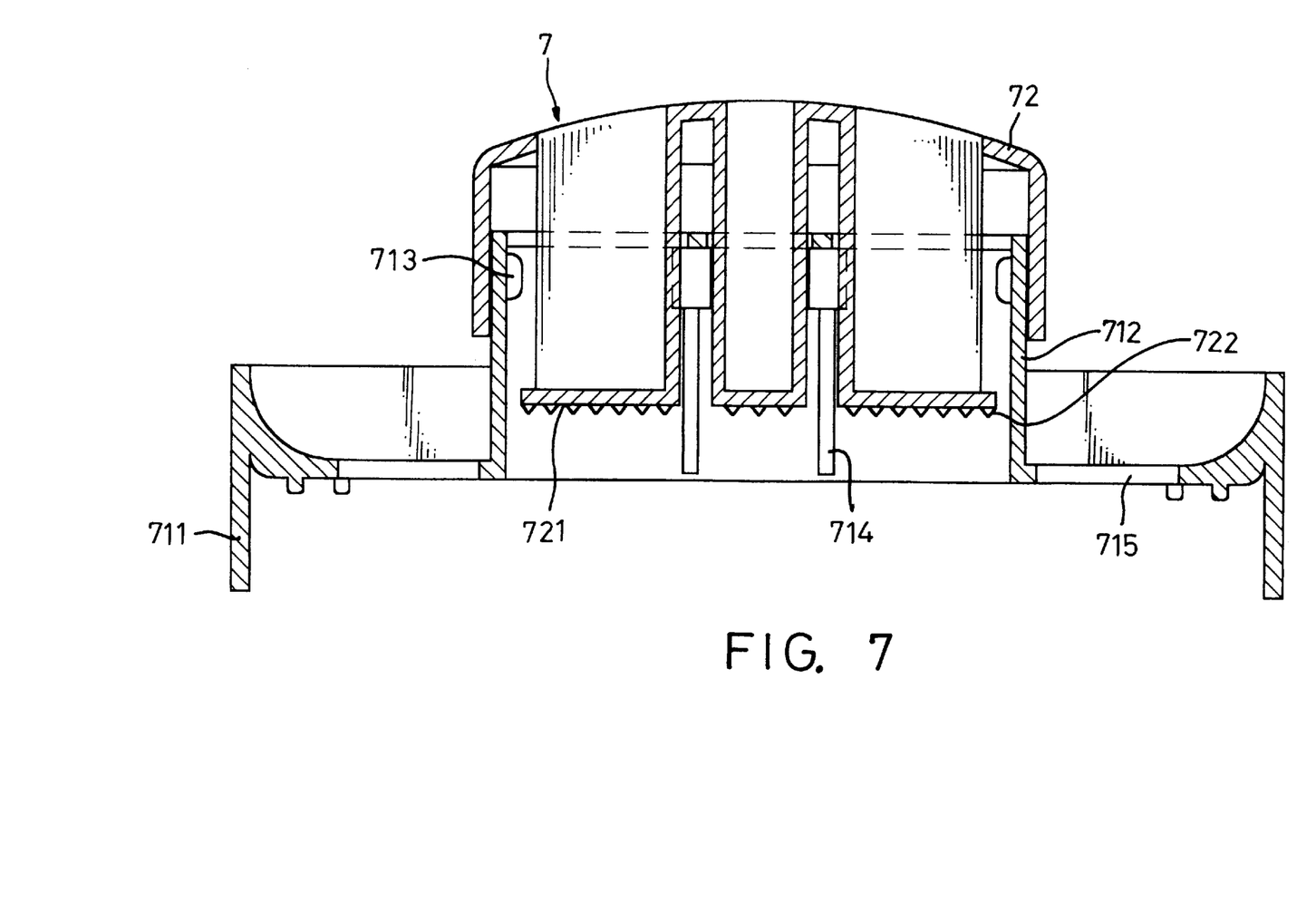
FIG. 7 is a sectional view of the sliding device shown in FIG. 6 after assembled.

Referring to FIGS. 6 and 7, in order to avoid the danger of the user carelessly contacting the cutters 313 during carrying the treated food, a slide device 7 may be mounted on the food processor. The slide device 7 is comprised of a slide plate 71 having a size a little greater than the processor rack 1 astride the frame walls 12. A stop wall 711 is provided at both lateral sides of the slide plate 71 respectively to lean against the frame walls 12 while the slide plate 71 moves on top of the base plate 11. The slide plate 71 at the central area thereof has an upright cylindrical part 712 and the inner wall of the cylindrical part 712 provides a plurality of equally spaced engaging projections 713. A plurality of engaging poles 714 extend downward from the top of the cylindrical part 712. A double layer grip disk 72 fits with the cylindrical part 712 to make a disk facial plane 721 at the bottom of an inner ring thereof is kept by the engaging projections 713 from loosening. The disk facial plane 721 at the bottom thereof is provided with a plurality of sharp cone 722 to be inserted into the treated food together with the engaging poles 714 so as to form a connection part between the slide device and the treated food. Furthermore, in order to obtain the juice of treated food, a sharp cone shaped juicer 73 can be inserted into the cylindrical part 712 from the top thereof.

The juicer 73 at the bottom thereof is provided with engaging parts 731 and a plurality of engaging notches 732 to engage with the engaging projections 713. Thus, the juice may flow into the container via slots 715 on the slide plate 71.

Referring to the figures again, the operation of the present invention will be explained in detail further hereinafter. At first, place the processing rack 1 astride a container or stretch out the support device 5. When an operation of slicing or grinding is going to be performed, an appropriate tool stand 4 is selected to fixedly attach an end of the processor rack 1. Then, adjust the turning knob 23 such that the wedge 211 on the push lever 21 may displace to actuate the wedge 111 together with the base plate 11 displacing vertically for changing the difference of elevation between the base plate 11 and the cutter 41. In the mean time, the treated food is fixedly attached to the bottom of the slide device 7 such that the operator can hold the grip disk 72 with a hand to make the slide plate 71 slide on the base plate 11 along with the treated food. When the treated food touches the cutter 41, the slice product with desired thickness or the powder product with desired grains can be cut or ground properly. For the treated food being cut into shreds, procedures, such as selecting a appropriate tool stand 4, and adjusting the elevated device 2 to obtain a desired difference of elevation between the base plate 11 and the cutter 41, have to be performed first. It is noted that these procedures required in the slice cutting and the powder grinding and have been described already. Then, the turning knob 32 is pulled outward and turned to rotate the carriage shaft 31 till the cutters 313 with desired cutting width emerging through the guide slots 112 and make the rotary device 3 be in a state of locking. Meanwhile, during sliding on the base plate, the treated food is cut a depth and a width by the equally spaced cutters 313 first, and then into shreds or strips as finished products while pass through the cutter 41.

Accordingly, the present invention can be summarized the following advantages from a detailed explanation of preferred embodiment in the preceding description:

1) It provides multiple purposes and occupies a very limited space. Because the food processor provides multiple functions, an appropriate tool stand can be easily selected to perform a specific operation for slice or shred cutting, or powder grinding instead of the prior art providing merely a single function. Therefore, it is not necessary for the user to buy a variety of conventional food processors for different purposes and save a lot of space for a kitchen having a limited area.

2) It is easily cleaned up. Because a simplified structure is provided for the present invention, there is no dead corner involved so that it can be cleaned up completely by way of water merely. Therefore, it is not possible to be left stains or filth therein for breeding germs and being harmful to our health.

3) It is convenient in use. The present invention is manually operated and not restricted by the power source so that it can be operated outdoors as well as indoors. In addition, it is easily operated such that a fun in cooking or at meals can be enhanced greatly.

4) It is not restricted by the size of treated food. The present invention can cut or grind the treated food directly regardless the size thereof. For instance, a little cucumber or a carrot can be cut into slices longitudinally, or shreds or strips transversely. There is no need to cut the treated food into pieces before being admitted the food processor as the prior art does. Therefore, the deficiencies in the prior art such as the finished product being too short in length or not enough in quantity may not occur in the present invention.

While the invention has been described with reference to preferred embodiments thereof, it is to be understood that modifications or variations may be easily made without departing from the spirit of this invention, which is defined by the appended claims.

What is claimed is:

1. A multi-functional food processor, comprising:

a processing rack, being an elongated framework, further comprising a base plate in the middle area thereof, two opposite lateral frame walls, and a tool stand at an end thereof, wherein a longitudinal gap being provided between the base plate and each of the frame walls respectively frame, the base plate being provided with at least a wedge at the bottom thereof and the tool stand having a cutter adjacent the base plate; and an elevated device, further comprising a push lever with a wedge part being disposed at the bottom of said wedge, the wedge part being corresponding to and facially contacting with the wedge, and a threaded rod passing through the frame walls and engaging with the push lever;

whereby, the turning knob is turned to make the threaded rod along with the wedge part have a displacement, the wedge then is urged to move upward along an inclined surface on the wedge part and to change a difference of elevation between the base plate and the cutter, and a treated food passes through the difference of elevation is cut by the cutter to form a finished product with desired thickness.

2. The multi-functional food processor as defined in claim 1, wherein both lateral sides of the processor rack provide a locating hole respectively corresponding to the wedge to locate and engage with a lever seat, the lever seat receives the push lever, and the threaded rod on the turning knob engages with and passes through a fixing hole in the lever seat so as to fit with the push lever.

3. The multi-functional food processor as defined in claim 1, wherein the cutter is a flat knife, a wavy knife, or a grinding disk.

4. The multi-functional food processor as defined in claim 1, wherein the tool stand has two opposite lateral stand walls and the stand walls are provided with a projecting part respectively at an end thereof to engage with corresponding notches disposed in the frame walls; and a lock piece is disposed at an outer end of the tool stand to engage with a lock device at a rear end of the processing rack to make the tool stand be fixedly attached to the rear end of the processing rack.

5. The multi-functional food processor as defined in claim 4, wherein the lock device has an engaging recession corresponding to the lock piece and a vertical guide groove at a lateral side thereof for being inserted a slide lock, and the lock piece is placed in the engaging recession and the slide lock is moved to engage with the lock piece.

6. The multi-functional food processor as defined in claim 1, wherein the bottom of the processing rack at both lateral sides thereof provides a plurality of locating notches for straddling a container.

7. The multi-functional food processor as defined in claim 1, further comprises a support device having a H support frame with fitting holes at an end thereof, being mounted between the frame walls, the fitting holes aligning with recess holes on a handle part to engage with a pivot bolt respectively, and the support frame being stretched outward and resulting in the base plate being in a state of inclined disposition.

8. The multi-functional food processor as defined in claim 7, wherein the support frame at a bottom thereof is provided with a plurality of locating notches together with the locating notches at the other end of the processing rack to straddle a container.

9. The multi-functional food processor as defined in claim 1, further comprises a slide device, said slide device comprising:

a slide plate, having a width a little greater than that of the processor rack, at the central area thereof having an upright cylindrical part and an inner wall of the cylindrical part providing a plurality of engaging projections, and a plurality of engaging poles extend downward at the cylindrical part; and a grip disk, being double layer annular, movably fitting with the cylindrical part, a disk facial plane at the bottom of an inner ring thereof being kept by the engaging projections from loosening, and the disk facial plane at the bottom thereof having a plurality of sharp cone;

whereby, the engaging poles together with the sharp cones insert into a treated food so as to slide on the base plate.

10. The multi-functional food processor as defined in claim 9, wherein a sharp cone shaped juicer is provided to engage with the cylindrical part, and at a bottom thereof is provided with engaging parts with engaging notches to engage with the engaging projections.

11. A multi-functional food processor, comprising:

a processing rack, being an elongated framework, further comprising a base plate in the middle area thereof with a plurality of equally spaced guide slots in parallel at an free end thereof, and a tool stand being disposed at an end thereof near the base plate and having a cutter adjacent the free end of the base plate; and a rotary device, being a cutter carriage disposed under the guide slots, having two flat planes oppositely inclining an equal angle and at least a cutting plane, a plurality of equally spaced cutters being provided on the cutting plane corresponding to the guide slots, a shaft with turning knob passing through frame walls of the processing rack and an axial locating hole thereof to fitting with the bottom of the processing rack, and a lock device, being provided between the turning knob and the processing rack;

whereby, release the lock device, turn the turning knob to emerge the selected cutters through the slide slots, make the lock device in a state of locking, and a treated passes through the cutters to be cut into a depth and a width, then, cut into pieces by the cutter on the tool stand.

12. The multi-functional food processor as defined in claim 11, wherein the lock device is that the shaft passes through the fitting holes in the processing rack and a axial locating hole in the cutter carriage and an fitting end of the shaft being enclosed by a spring and engaging with a fixing plate between two stop pieces at two opposite sides of one of the fitting holes, the other fitting hole being provided with a plurality of lock recessions with equal angular space around the edge thereof based on the sum of the flat planes and the cutting planes, the turning knob providing a plurality of lock pieces to correspond to the lock recessions; when the turning knob is pulled outward, the fixing plate presses the spring to separate the lock pieces from the lock recessions and the lock device is in a state of unlocking.

13. The multi-functional food processor as defined in claim 11, wherein the cutter on the tool stand is a flat knife.

14. The multi-functional food processor as defined in claim 11, wherein the processing rack under the rotary device can be provided with a movable safety cover for opening and closing.

15. The multi-functional food processor as defined in claim 11, wherein the tool stand has two opposite lateral stand walls and the stand walls are provided with a projecting part respectively at an end thereof to engage with corresponding notches disposed in the frame walls; and a lock piece is disposed at an outer end of the tool stand to engage with a lock device at a rear end of the processing rack to make the tool stand be fixedly attached to the rear end of the processing rack.

16. The multi-functional food processor as defined in claim 15, wherein the lock device has an engaging recession corresponding to the lock piece and a vertical guide groove at a lateral side thereof for being inserted a slide lock, and the lock piece is placed in the engaging recession and the slide lock is moved to engage with the lock piece.

17. The multi-functional food processor as defined in claim 11, wherein the bottom of the processing rack at both lateral sides thereof provides a plurality of locating notches for straddling a container.

18. The multi-functional food processor as defined in claim 11, further comprises a support device having a H support frame with fitting holes at an end thereof, being mounted between the frame walls, the fitting holes aligning with recess holes on a handle part to engage with a pivot bolt respectively, and the support frame being stretched outward and resulting in the base plate being in a state of inclined disposition.

19. The multi-functional food processor as defined in claim 18, wherein the support frame at a bottom thereof is provided with a plurality of locating notches together with the locating notches at the other end of the processing rack to straddle a container.

20. The multi-functional food processor as defined in claim 11, further comprises a slide device, said slide device comprising:

a slide plate, having a width a little greater than that of the processor rack, at the central area thereof having an upright cylindrical part and an inner wall of the cylindrical part providing a plurality of engaging projections, and a plurality of engaging poles extend downward at the cylindrical part; and a grip disk, being double layer annular, movably fitting with the cylindrical part, a disk facial plane at the bottom of an inner ring thereof being kept by the engaging projections from loosening, and the disk facial plane at the bottom thereof having a plurality of sharp cone;

whereby, the engaging poles together with the sharp cones insert into a treated food so as to slide on the base plate.

21. The multi-functional food processor as defined in claim 20, wherein a sharp cone shaped juicer is provided to engage with the cylindrical part, and at a bottom thereof is provided with engaging parts with engaging notches to engage with the engaging projections.

22. A multi-functional food processor, comprising:

a processing rack, being an elongated framework with a central base plate and two opposite frame walls, a longitudinal gap being provided between the base plate and each of the frame walls respectively, the base plate at a free end thereof being provided with at least a wedge at the bottom and a plurality of equally spaced guide slots in parallel nearby, and a tool stand being disposed at an end thereof near the base plate and having a cutter adjacent the free end of the base plate;

an elevated device, further comprising a push lever with a wedge part being disposed at the bottom of said wedge, the wedge part being corresponding to and facially contacting with the wedge, and a threaded rod passing through the frame walls and engaging with the push lever; and a rotary device, being a cutter carriage disposed under the guide slots, having two flat planes oppositely inclining an equal angle and at least a cutting plane, a plurality of equally spaced cutters being provided on the cutting plane corresponding to the guide slots, a shaft with turning knob passing through frame walls of the processing rack and an axial locating hole thereof to fitting with the bottom of the processing rack, and a lock device, being provided between the turning knob and the processing rack;

whereby, the turning knob is turned to make the threaded rod along with the wedge part have a displacement, the wedge then is urged to move upward along an inclined surface on the wedge part and to change a difference of elevation between the base plate and the cutter, and a treated food passes through the difference of elevation is cut by the cutter to form a finished product with desired thickness; or release the lock device, turn the turning knob to emerge the selected cutters through the slide slots, make the lock device in a state of locking, and a treated passes through the cutters to be cut into a depth and a width, then, cut into pieces by the cutter on the tool stand.

23. The multi-functional food processor as defined in claim 22, wherein both lateral sides of the processor rack provide a locating hole respectively corresponding to the wedge to locate and engage with a lever seat, the lever seat receives the push lever, and the threaded rod on the turning knob engages with and passes through a fixing hole in the lever seat so as to fit with the push lever.

24. The multi-functional food processor as defined in claim 22, wherein the lock device is that the shaft passes through the fitting holes in the processing rack and a axial locating hole in the cutter carriage and an fitting end of the shaft being enclosed by a spring and engaging with a fixing plate between two stop pieces at two opposite sides of one of the fitting holes, the other fitting hole being provided with a plurality of lock recessions with equal angular space around the edge thereof based on the sum of the flat planes and the cutting planes, the turning knob providing a plurality of lock pieces to correspond to the lock recessions; when the turning knob is pulled outward, the fixing plate presses the spring to separate the lock pieces from the lock recessions and the lock device is in a state of unlocking.

25. The multi-functional food processor as defined in claim 22, wherein the cutter is a flat knife, a wavy knife, or a grinding disk.

26. The multi-functional food processor as defined in claim 22, wherein the processing rack under the rotary device can be provided with a movable safety cover for opening and closing.

27. The multi-functional food processor as defined in claim 22, wherein the tool stand has two opposite lateral stand walls and the stand walls are provided with a projecting part respectively at an end thereof to engage with corresponding notches disposed in the frame walls; and a lock piece is disposed at an outer end of the tool stand to engage with a lock device at a rear end of the processing rack to make the tool stand be fixedly attached to the rear end of the processing rack.

28. The multi-functional food processor as defined in claim 27, wherein the lock device has an engaging recession corresponding to the lock piece and a vertical guide groove at a lateral side thereof for being inserted a slide lock, and the lock piece is placed in the engaging recession and the slide lock is moved to engage with the lock piece.

29. The multi-functional food processor as defined in claim 22, wherein the bottom of the processing rack at both lateral sides thereof provides a plurality of locating notches for straddling a container.

30. The multi-functional food processor as defined in claim 22, further comprises a support device having a H support frame with fitting holes at an end thereof, being mounted between the frame walls, the fitting holes aligning with recess holes on a handle part to engage with a pivot bolt respectively, and the support frame being stretched outward and resulting in the base plate being in a state of inclined disposition.

31. The multi-functional food processor as defined in claim 30, wherein the support frame at a bottom thereof is provided with a plurality of locating notches together with the locating notches at the other end of the processing rack to straddle a container.

32. The multi-functional food processor as defined in claim 22, further comprises a slide device, said slide device comprising:

a slide plate, having a width a little greater than that of the processor rack, at the central area thereof having an upright cylindrical part and an inner wall of the cylindrical part providing a plurality of engaging projections, and a plurality of engaging poles extend downward at the cylindrical part; and a grip disk, being double layer annular, movably fitting with the cylindrical part, a disk facial plane at the bottom of an inner ring thereof being kept by the engaging projections from loosening, and the disk facial plane at the bottom thereof having a plurality of sharp cone;

whereby, the engaging poles together with the sharp cones insert into a treated food so as to slide on the base plate.

33. The multi-functional food processor as defined in claim 32, wherein a sharp cone shaped juicer is provided to engage with the cylindrical part, and at a bottom thereof is provided with engaging parts with engaging notches to engage with the engaging projections.

* * * * *